(No Model.)  A. H. SMITH.  2 Sheets—Sheet 1.
DUMP CART.
No. 465,328.  Patented Dec. 15, 1891.
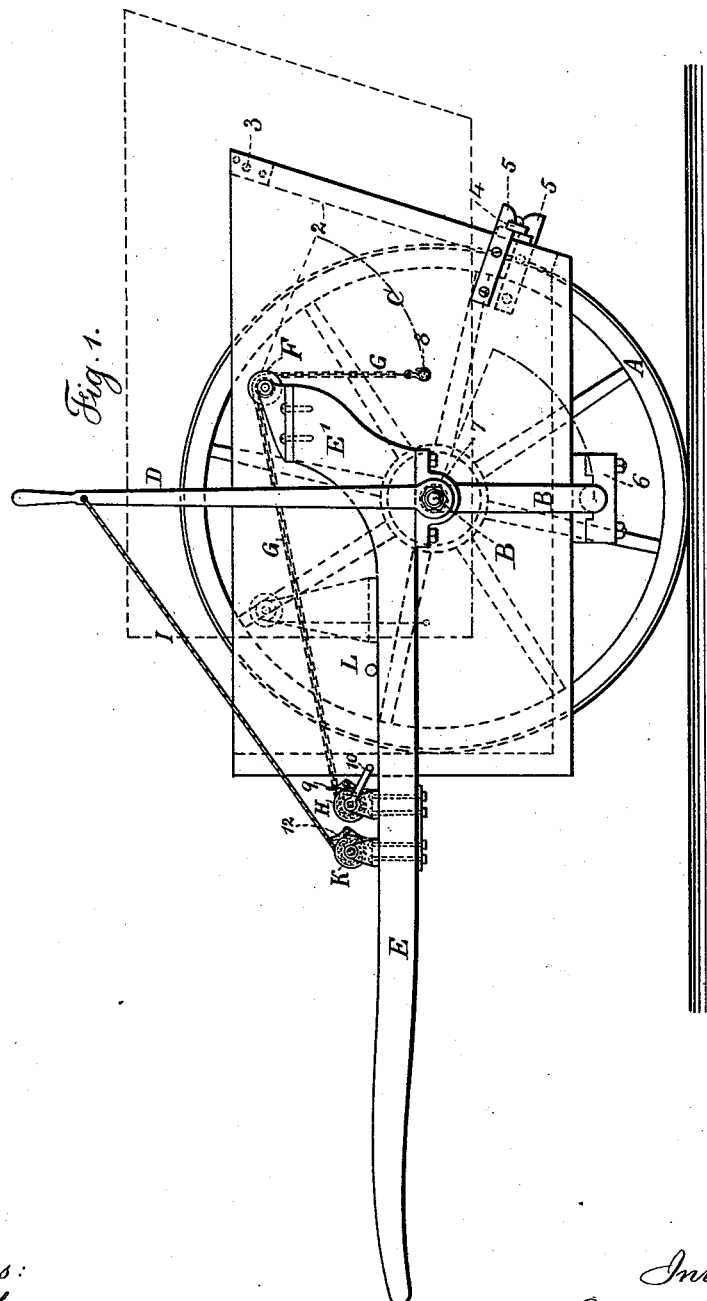
Witnesses:
J. Stait
Chas H. Smith
Inventor:
Andrew H. Smith
per Lemuel W. Serrell Atty.

(No Model.) 2 Sheets—Sheet 2.

A. H. SMITH.
DUMP CART.

No. 465,328. Patented Dec. 15, 1891.

Witnesses.
J. Staib
Chas. H. Smith

Inventor:
Andrew H. Smith
per L. W. Serrell, Atty.

ER
UNITED STATES PATENT OFFICE.

ANDREW H. SMITH, OF NEW YORK, N. Y.

DUMP-CART.

SPECIFICATION forming part of Letters Patent No. 465,328, dated December 15, 1891.

Application filed May 2, 1891. Serial No. 391,332. (No model.)

*To all whom it may concern:*

Be it known that I, ANDREW H. SMITH, a citizen of the United States, residing at the city, county, and State of New York, have invented an Improvement in Dump-Carts, of which the following is a specification.

Carts have heretofore been made in which the central portion of the axle is depressed as a crank, in order that the body of the cart may be comparatively near the ground, so that the material placed in such body may not have to be elevated unnecessarily high.

My present invention is especially adapted to dump-carts that receive street-sweepings; but it may be used for other purposes. I make use of a crank or drop axle, to which a lever is connected, and the axle is pivoted to the body of the cart, and there is a suspending device parallel, or nearly so, to the crank of the axle, so that the axle and the suspending device may swing together as the axle is rotated by the lever in raising the body of the cart into a position sufficiently high for dumping the contents.

Figure 3:
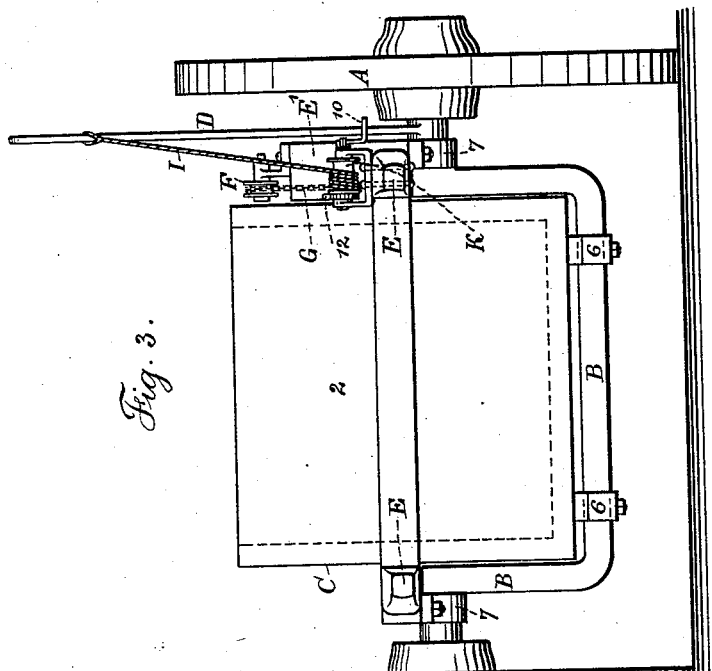
Figure 2:
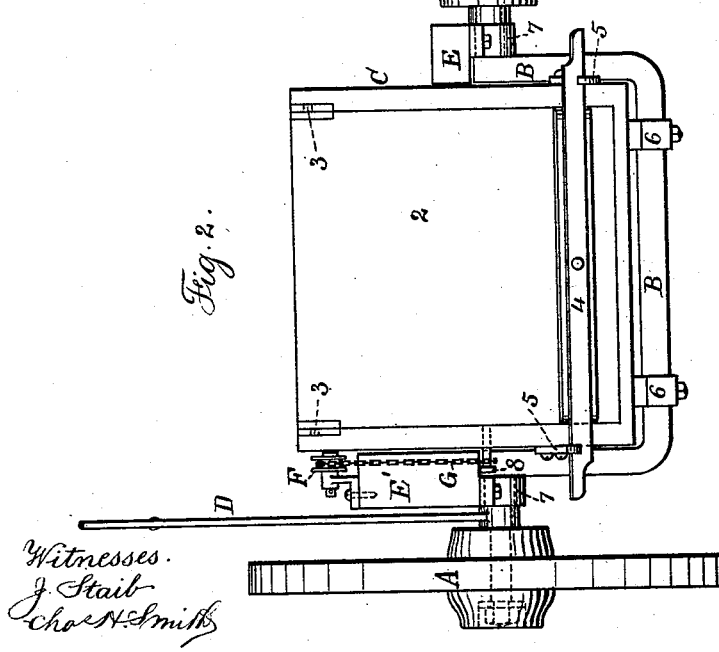

In the drawings, Figure 1 is a side view with the near wheel removed. Fig. 2 is a rear elevation of the wagon, and Fig. 3 is a front view of the same.

The wheels A are of suitable size and character, and the axle B is depressed in the middle or made crank-shaped, so that the body C is between the two crank portions of the axle. This body C is to be of any desired size or character. Usually the tail-board 2 is pivoted at 3 and provided with a cross-lever 4, engaging the latches 5 for holding the tail-board in a closed position, and by moving this cross-lever 4 it is separated from the stationary latches 5, so that the tail-board swings open for the discharge of the contents of the body. The body C is connected to the axle B, pivotally by suitable bearings or boxes 6 upon the bottom of the body, so that the body is free to be turned in relation to the axle, and the axle also may be swung as a crank upon the wheels, the hubs of which form the pivots for the axle, and in order to swing this axle B a lever D is provided, extending upwardly from the axle at one side and adjacent to one of the wheels A.

The thills E or shafts are of suitable size and character adapted to receive the horse or to be connected to a street-sweeping machine, so as to be drawn behind the said machine and receive the sweepings, and upon the rear portions of these thills there are bearings or boxes 7, connecting them to the axle B adjacent to the wheels, and there is also an upward extension at E' behind and above the axle for the reception of the chain-wheel sheave F, over which passes a rope or chain G, that is connected at its rear end to the cart-body C by a stud or projection 8, and the position of the chain-wheel F and stud is such that the length of the chain or rope G from the chain-wheel F to the stud 8 corresponds to the radius of the crank-axle, or nearly so, and such crank-axle and this portion of the rope or chain are parallel, or nearly so.

The forward end of the rope or chain G may be acted upon by any suitable means. I have represented a small winch H with a pawl 9 and crank-handle 10, by which this rope or chain G can be drawn in or let out with convenience, and the lever D may be actuated by hand in cases where the contents of the body C are not too heavy; but I have represented a rope or chain I extending from near the upper end of the lever D to a winch K, having a pawl 12, and a square shaft for the crank-handle for winding up or letting out the rope or chain I, and there is preferably a stud or projection L from the side of the box or body C resting upon one of the thills E when the body of the cart is in its normal position.

It will now be understood that when the cart is in the position indicated by the full lines, Fig. 1, the street-sweepings or other materials may be thrown or deposited in the cart-body, as usual, and the cart-body itself is as low down as desired, according to the length of the axle-cranks. Hence the materials do not require to be elevated unnecessarily high. After the contents have been placed in the cart-body and it is desired to dump the same the lever D is drawn forward and the cart-body elevated by swinging the axle-cranks upwardly to a greater or less extent, according to the place where the dumping is effected, and in doing this the portion of the rope or chain G between the wheel or sheave F and the stud 8 describes a similar arc of a circle to that of the crank-axle and the cart-body is maintained in a nearly level position while being elevated, and it is to be understood that the preponderance of weight will be toward the back, so as to prevent the body tipping forward, and when the body is sufficiently elevated the tail-board is to be unlatched and the winch H operated to lower the rear of the cart-body and allow the contents of the body to dump, such body swinging upon the bearings 6, after which the parts are restored to their normal position with facility.

It will be apparent that the lever D might be swung backwardly to throw the crank of the axle forward if the other parts of the cart were arranged to allow of this movement. It will also be apparent that a roller or a notched bearing may take the place of the chain wheel or sheave F, and a metal bar might be employed as a connection for the rope or chain G between the wheel or bearing F and the stud 8. If this bearing or wheel F were placed forward of the axle, as indicated by dotted lines in Fig. 1, the same operation would be performed; but in that case the weight in the cart-body should be principally forward of the axle.

A segment of a wheel on the cranked axle might be used as the equivalent of a lever to give motion to the cranked axle, such device being acted upon by a pinion, a worm, or other suitable mechanism.

I claim as my invention—

1. The combination, with the thills, wheels, and cranked axle, of the cart-body above and pivotally connected to the crank of the axle, mechanism for turning the cranked axle in the wheel-hubs and raising the body of the cart, and a connecting device between the thill and body of the cart and parallel, or nearly so, to the crank-axle, for keeping the body level, or nearly so, as it is raised bodily, substantially as and for the purposes set forth.

2. The combination, with the wheels and cranked axle, of a cart-body above and pivotally connected to the crank of the axle, and mechanism for turning the cranked axle in the wheel-hubs to elevate the body previous to tipping the same to discharge the contents, substantially as set forth.

3. The combination, with the wheels and cranked axle, of a cart-body above and pivotally connected to the crank of the axle, mechanism for swinging the axle to elevate the cart-body, a chain or rope connected at one end to the cart-body, and a bearing connected with the thills or shaft and over which such chain or rope passes, for holding the body in position while being elevated and then dumping the contents by slackening the chain, substantially as set forth.

Signed by me this 28th day of April, 1891.

ANDREW H. SMITH.

Witnesses:
 GEO. T. PINCKNEY,
 WILLIAM G. MOTT.